United States Patent
Zavriyev et al.

(10) Patent No.: US 7,720,228 B2
(45) Date of Patent: May 18, 2010

(54) MODULATOR AUTOCALIBRATION METHODS FOR QUANTUM KEY DISTRIBUTION

(75) Inventors: Anton Zavriyev, Swampscott, MA (US); Harry Vig, North Billerica, MA (US)

(73) Assignee: MagiQ Technologies, Inc, New York, NY (US)

( * ) Notice: Subject to any disclaimer, the term of this patent is extended or adjusted under 35 U.S.C. 154(b) by 960 days.

(21) Appl. No.: 10/588,015

(22) PCT Filed: Feb. 24, 2005

(86) PCT No.: PCT/US2005/006014

§ 371 (c)(1), (2), (4) Date: Aug. 1, 2006

(87) PCT Pub. No.: WO2005/086409

PCT Pub. Date: Sep. 15, 2005

(65) Prior Publication Data

US 2007/0160212 A1    Jul. 12, 2007

Related U.S. Application Data

(60) Provisional application No. 60/549,357, filed on Mar. 2, 2004.

(51) Int. Cl.
*H04L 9/28* (2006.01)
*H04K 1/00* (2006.01)
*G01R 35/00* (2006.01)

(52) U.S. Cl. .............................. 380/263; 380/28; 702/85
(58) Field of Classification Search ........................ None
See application file for complete search history.

(56) References Cited

U.S. PATENT DOCUMENTS 7,227,955 B2 * 6/2007 Trifonov et al. ............. 380/256

(Continued)

OTHER PUBLICATIONS

Vakhitov et al, "Large pulse attack as a method of conventional optical eavesdropping in quantum cryptography", Jun. 2001, Journal of Modern Optics, No. 13, p. 2023-2038.*

(Continued)

*Primary Examiner*—Christopher A Revak
(74) *Attorney, Agent, or Firm*—Opticus IP Law PLLC

(57) ABSTRACT

Methods for calibrating the modulators in a QKD system (100) are disclosed. The methods include setting the voltage ($V_B$) of Bob's modulator (MB) to a positive value and then adjusting the voltage ($V_A$) of Alice's modulator (MA) in both the positive and negative direction to obtain overall relative phase modulations that result in maximum and minimum photon counts (N) in the two single-photon detectors (32a, 32b). Bob's modulator voltage is then set to a negative value and the process repeated. When the basis voltages ($V_B(1)$, $V_B(2)$, $V_A(1)$, $V_A(2)$, $V_A(3)$ and $V_A(4)$) are established, the QKD system is operated with intentionally selected incorrect bases at Bob and Alice to assess orthogonality of the basis voltages by assessing whether or not the probability of photon detection at the detectors is 50:50. If not, the modulator voltages are adjusted to be orthogonal. This involves changing Bob's basis voltage ($V_B(1)$ and/or $V_B(2)$) and repeating the process until a 50:50 detector count distribution is obtained. The calibration method can be carried out periodically during QKD system operation to ensure optimum or near-optimum operation of the modulators.

13 Claims, 4 Drawing Sheets

U.S. PATENT DOCUMENTS

| | | | |
|---|---|---|---|
| 7,242,775 B2 * | 7/2007 | Vig et al. | 380/263 |
| 2004/0190725 A1 | 9/2004 | Yuan et al. | |
| 2005/0100351 A1 | 5/2005 | Yuan et al. | |
| 2005/0111667 A1 * | 5/2005 | Vig et al. | 380/278 |
| 2007/0110242 A1 * | 5/2007 | Tomita et al. | 380/255 |
| 2008/0134042 A1 * | 6/2008 | Jankovich | 715/733 |
| 2009/0150561 A1 * | 6/2009 | Vig | 709/237 |

OTHER PUBLICATIONS

"Study on sending after verify scheme in quantum channel for quantum key distribution based on polarization coding", Jul. 2009, The Institution of Engineering and Technology, abstract.*

Merolla et al, "Phase-modulation transmission system for quantum cryptography", Optics Letters vol. 24, No. 2, pp. 104-106, 1999.

* cited by examiner

US 7,720,228 B2

MODULATOR AUTOCALIBRATION METHODS FOR QUANTUM KEY DISTRIBUTION

CLAIM OF PRIORITY

This patent application claims priority from U.S. Provisional Patent Application No. 60/549,357, filed on Mar. 2, 2004.

FIELD OF THE INVENTION

The present invention relates to and has industrial utility in the field of quantum cryptography, and in particular relates to methods for automatically calibrating modulators in quantum key exchange (QKD) systems.

BACKGROUND ART

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals and thus reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in publications by C. H. Bennett et al., entitled "Experimental Quantum Cryptography," J. Cryptology 5: 3-28 (1992), and by C. H. Bennett, entitled "Quantum Cryptography Using Any Two Non-Orthogonal States," Phys. Rev. Lett. 68 2121 (1992).

The general process for performing QKD is described in the book by Bouwmeester et al., "The Physics of Quantum Information," Springer-Verlag 2001, in Section 2.3, pages 27-33. During the QKD process, Alice uses a random number generator (RNG) to generate a random bit for the basis ("basis bit") and a random bit for the key ("key bit") to create a qubit (e.g., using polarization or phase encoding) and sends this qubit to Bob.

The above mentioned publications by Bennett each describe a so-called "one-way" QKD system wherein Alice randomly encodes the polarization or phase of single photons at one end of the system, and Bob randomly measures the polarization or phase of the photons at the other end of the system. The one-way system described in the Bennett 1992 paper is based on two optical fiber Mach-Zehnder interferometers. Respective parts of the interferometric system are accessible by Alice and Bob so that each can control the phase of the interferometer. The interferometers need to be actively stabilized to within a portion of quantum signal wavelength during transmission to compensate for thermal drifts.

U.S. Pat. No. 6,438,234 to Gisin (the '234 patent) discloses a so-called "two-way" QKD system that is autocompensated for polarization and thermal variations. Thus, the two-way QKD system of the '234 patent is less susceptible to environmental effects than a one-way system.

However, in autocompensated and actively stabilized QKD systems, it is the optics layer that is stabilized or compensated. As it turns out, drifts can and do occur in the electronics necessary to stably operate the QKD system. For example, in a phase-encoding QKD system, if the voltage used to set the phase modulators drifts over time, then the phase imparted to the optical pulses will drift over time. The same is true for polarization modulators in polarization-encoding systems. This drift results in the pulses not having precise phase or polarization modulation, which reduces the ability to detect the encoded pulses. If this drift goes uncompensated, the operation of the QKD system continually diminishes, and can even reach the point where the QKD system can no longer operate.

Also, when performing the analysis of the basis measurements under particular QKD protocol (e.g., the BB84 protocol), there needs to be a 50:50 chance of Bob's detectors detecting signals measured in a basis different from Alice's basis. To the extent this probability differs from 50:50, an eavesdropper has a potential advantage because the uncertainty associated with a "wrong" basis measurement is reduced. This variation from a 50:50 probability distribution can occur because the modulator basis voltages are not "orthogonal," i.e., a change in basis voltage by a discrete amount (e.g., from $V[-\pi/4]$ to $V[\pi/4]$) does not result in the modulator providing the corresponding phase difference of $\pi/2$.

SUMMARY OF THE INVENTION

The present invention relates to and has industrial utility in the field of quantum cryptography, and in particular to quantum key distribution (QKD). The invention provides methods for performing phase or polarization modulation calibration of a QKD system. The invention is described in connection with the operation of a two-way QKD system, though the methods are not so limited.

As described in detail below, an example embodiment of the invention as applied to a two-way QKD system includes setting Bob's (timed) modulator voltage $V_B$ to a first positive value (say, $V_B(1) = V_B[\pi/4]$) and then adjusting Alice's modulator voltage $V_A$ in both the positive and negative directions while exchanging pulses. Thus, the only difference between normal operation of the QKD system and the calibration operation is that the modulators are not randomly modulated.

The variation in Alice's modulator voltage is carried out to find respective overall basis voltages $V_A(1)$ and $V_A(2)$ that in one case correspond to a maximum number of counts in one detector due to constructive interference and in the other case as a maximum number of counts in the other detector due to destructive interference. In the example where $V_B(1)=V_B[\pi/4]$, the corresponding basis voltages for Alice are set at $V_A(1)=V_A[-\pi/4]$ and $V_A(2)=V_A[3\pi/4]$.

Bob's modulator voltage $V_B$ is then set to a negative value (e.g., $V_B(2)=V_B(-\pi/4)$) and the process repeated to obtain two more nominal basis voltages arid for Alice, namely $V_A(3)=V_A(\pi/4)$ and $V_A(4)=V_A[-3\pi/4]$. When all of the basis voltages are set (calibrated), the QKD system is operated to verify orthogonality between the basis voltages. This is accomplished by purposely selecting "incorrect" basis voltage values at Bob and Alice and measuring the probability distribution of detecting a photon at each of two detectors. If the probability distribution is not 50:50, one or more of Bob's modulator basis voltage values $V_B(1)$ and $V_B(2)$ is/are adjusted and the above-described process repeated until a detector count probability distribution of 50:50 is obtained for the "incorrect" measurement bases. This establishes orthogonality between the established basis voltages and provides calibrated basis voltage values $V_B(1)$ and $V_B(2)$ for Bob and $V_A(1)$, $V_A(2)$, $V_A(3)$ and $V_A(4)$ for Alice.

The QKD system is then operated at the calibrated basis voltages, which correspond directly to the proper modulations for Alice's and Bob's modulators.

DETAILED DESCRIPTION OF THE INVENTION

Two-Way QKD System

Figure 1:
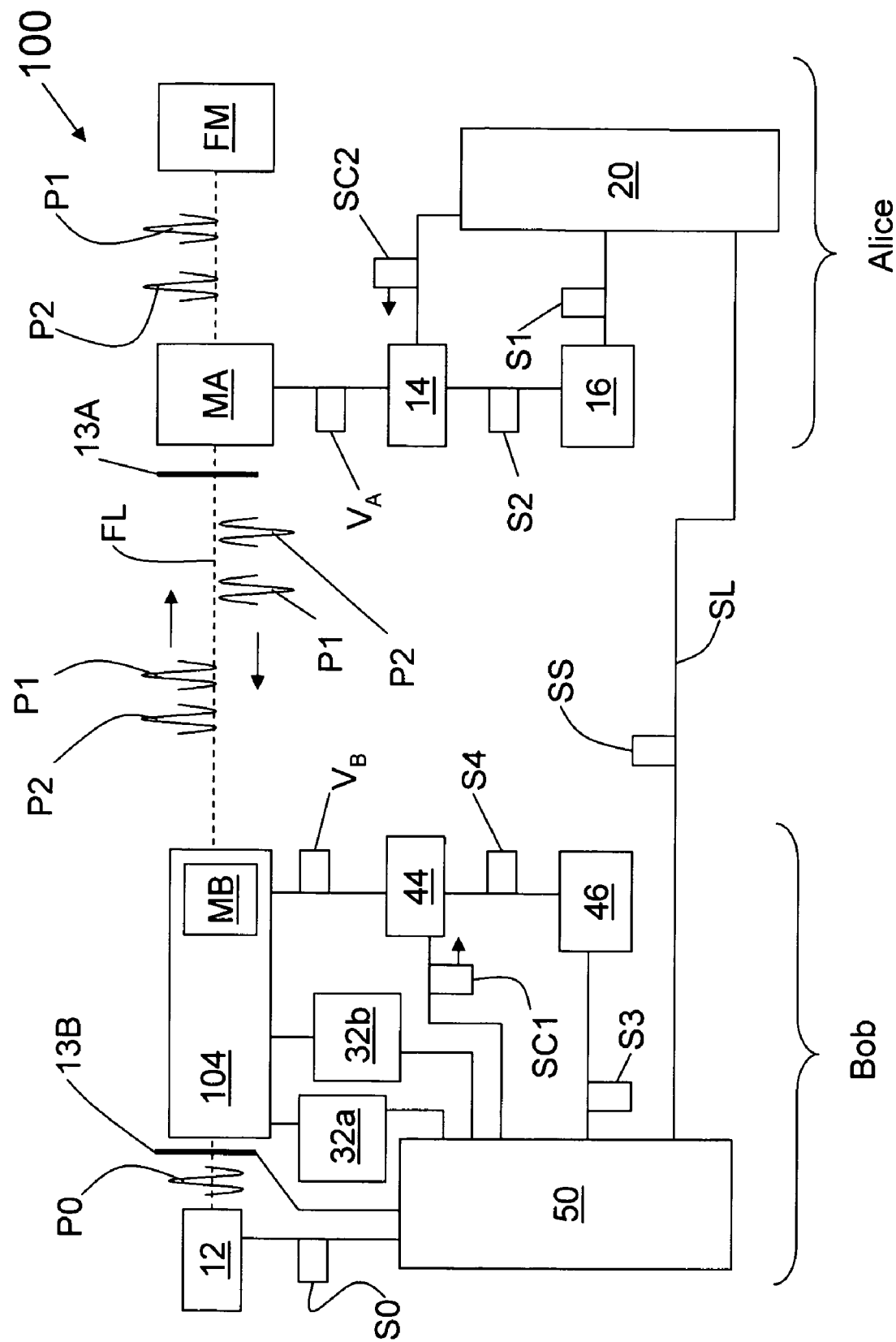
FIG. 1 is a schematic diagram of a two-way QKD system as arranged to provide for calibration of the modulators in Bob and Alice.

FIG. 1 is a schematic diagram of a two-way QKD system 100. Bob includes a laser 12 that emits light pulses P0. Laser 12 is coupled to a time-multiplexing/demultiplexing (M/D) optical system 104. M/D optical system 104 receives input pulses P0 from laser 12 and splits each pulse into two time-multiplexed pulses P1 and P2 having orthogonal polarizations. Likewise, later on in the key exchange process (discussed below), optical system 104 receives from Alice the returned pairs of time-multiplexed pulses and combines (interferes) them into a single pulse.

Bob also includes a phase modulator MB in M/D optical system 104. An optical fiber link FL is coupled to M/D optical system 104 and connects Bob to Alice. Bob also includes a voltage controller 44 coupled to modulator MB, and a random number generator (RNG) unit 46 coupled to the voltage controller.

Bob also includes two detectors 32a and 32b coupled to M/D optical system 104. Bob further includes a controller 50 operatively (e.g., electrically) coupled to laser 12, detectors 32a and 32b, voltage controller 44 and RNG unit 46.

With continuing reference to FIG. 1, Alice includes a phase modulator MA coupled at one end to optical fiber link FL and at the opposite end to a Faraday mirror FM. Alice also includes voltage controller 14 coupled to modulator MA, and random number generator (RNG) unit 6 coupled to the voltage controller. Alice further includes a controller 20 coupled to RNG unit 16 and to voltage controller 14.

Bob's controller 50 is coupled (optically or electronically) to Alice's controller 20 via a synchronization link (channel) SL to synchronize the operation of Alice and Bob. In particular, the operation of the phase modulators MA and MB is coordinated by synchronization signals SS that pass from controller 50 to controller 20 (or vice versa, or both ways) over synchronization link SL. In an example embodiment, the operation of QKD system 100, including the calibration procedure described below, is controlled from either controller 20 or controller 50.

Method of Operation

With continuing reference to FIG. 1, in the operation of QKD system 100, Bob's controller 20 sends a signal S0 to laser 12, which in response thereto initiates a relatively strong, short laser pulse P0. Laser pulse P0 is then attenuated by an optional variable optical attenuator VOA 13B, which is operably coupled to and controlled by controller 50. The (attenuated) pulse P0 arrives at M/D optical system 104, which splits the pulse into two orthogonally polarized pulses, P1 and P2. Pulse P1 goes directly to optical fiber link FL, while pulse P2 is delayed and goes through modulator MB, which is not activated at this point. Pulses P1 and P2 pass from M/D optical system 104 to optical fiber link FL and travel over to Alice, with pulse P2 following pulse P1.

Note also that in another embodiment of system 100, pulses P0 and P1 can be relatively strong pulses that are attenuated by Alice using a VOA 13A located at Alice, wherein the pulses are attenuated to make them weak (quantum) pulses prior to them returning to Bob.

The pulses P1 and P2 pass through Alice's modulator MA and reflect off of Faraday mirror FM, which changes the polarization of the pulses by 90°. As the pulses travel back through modulator MA, Alice lets the first pulse P1 pass therethrough unmodulated, but modulates the phase (i.e., imparts a phase shift $\phi_A$ to) second pulse P2. It should be noted here that Alice could also choose to modulate pulse P1. Since pulses P1 and P2 are later interfered, it is not the phase imparted to each pulse that matters, but rather the relative phase between the two pulses.

The timing of the activation of modulator MA to coincide with the arrival of pulse P2 is provided by the synchronization signal SS shared between controllers 20 and 50, as described in greater detail below. In an example embodiment illustrated schematically in FIG. 1, the modulation is carried at Alice out by controller 20 providing a well-timed signal S1 to RNG unit 16, which provides a signal S2 representative of a random number to voltage controller 14. Voltage controller 14 then sends a timed voltage signal $V_A$ randomly selected from a set of basis voltages (e.g., $V[+3\pi/4]$, $[V-3\pi/4]$, $V[+\pi/4]$, and $V[-\pi/4]$) to modulator MA to randomly set the phase modulation to a corresponding basis phase, e.g., $+3\pi/4$, $-3\pi/4$, $\pi/4$ or $-\pi/4$. The selected voltage value $V_A$ (or the corresponding random number) is reported to controller 20 and the (corresponding) voltage information (or the corresponding phase information) stored therein. For the sake of illustration, the timing of the voltage signal $V_A$ can be considered as being based on signal S2. In practice, a separate timing signal (not shown) from controller 20 may be used.

The two pulses P1 and P2 then travel back to Bob and to M/D optical system 104. Pulse P2 passes unaltered through the optical system but pulse P1 passes through modulator MB and receives a phase shift $\phi_B$. The timing of the modulation of pulse P1 by phase modulator MB is provided by the synchronization signal SS shared between controllers 20 and 50. The modulation of pulse P1 by modulator MB is carried out by controller 50 providing a well-timed signal S3 to RNG unit 46, which provides a signal S4 representative of a random number to voltage controller 44. Voltage controller 44 then sends a timed voltage signal $V_B$ randomly selected from a set of voltages (e.g., $V[+\pi/4]$ or $V[-\pi/4]$) to modulator MB to randomly set the phase modulation to a corresponding basis phase, e.g., $+\pi/4$ or $-\pi/4$. The selected voltage value $V_B$ (or the corresponding random number) is reported to controller 50 and the voltage information (or corresponding phase information) stored therein. Again, for the sake of illustration, the timing of voltage signal $V_B$ may be considered as being based on signal S3. In practice, a separate timing signal (not shown) from controller 50 may be used.

Further, when pulses P1 and P2 enter M/D optical system 104, pulse P2 passes through without a delay, but pulse P1 is delayed by an amount equal to that originally imparted to pulse P2. M/D optical system then interferes the two pulses P1 and P2.

The single-photon detectors 32a and 32b are arranged so that constructive interference ($\phi_A-\phi_B=0$) between pulses P1 and P2 is detected by detector 32a, while destructive interference ($\phi_A-\phi_B=\pi$) is detected by detector 32b. When Bob imparts the same basis phase as Alice, a count in detector 32a indicates binary 0 and a count in detector 32b indicates binary 1. However, when Bob's basis phase is different from Alice's, there is no correlation in the detection of interfered pulses P1 and P2, and the interfered signal is detected in either detector 32a or 32b with equal probability (i.e., interfered the pulse has a 50:50 chance of being detected in either detector).

The process of exchanging pairs of pulses is repeated many times so that a large number of photons are detected in detectors 32a and 32b. Alice and Bob then publicly exchange information about their choice of basis modulations, and perform other processing of exchanged basis information (e.g., key sifting, error correction and privacy amplification) to establish a key that can be used to securely encode information.

Modulator Timing Set-Up

The description above is based on the idealized operation of a two-way QKD system. However, in practice, such systems do not automatically operate in an ideal state. Further, a commercially realizable system must first be set up to operate at or close to an ideal state, and then must be able to compensate for changes in its operating state to ensure ongoing operation in or close to the ideal operating state. The autocalibration methods set forth below presume that the modulator timing in QKD system 100 has been established via synchronization channel SL via synchronization signals SS.

Modulator Autocalibration

As mentioned above, drifts can and do occur in the electronic layers of QKD systems during system operation. In a commercially viable QKD system, the drifts need to be compensated so that the system can operate continuously. Accordingly, a method of performing modulator autocompensation is now described in connection with two-way QKD system 100. Note that the voltages used to set the modulators to a select phase are referred to herein as a "basis voltages."

Figure 2:
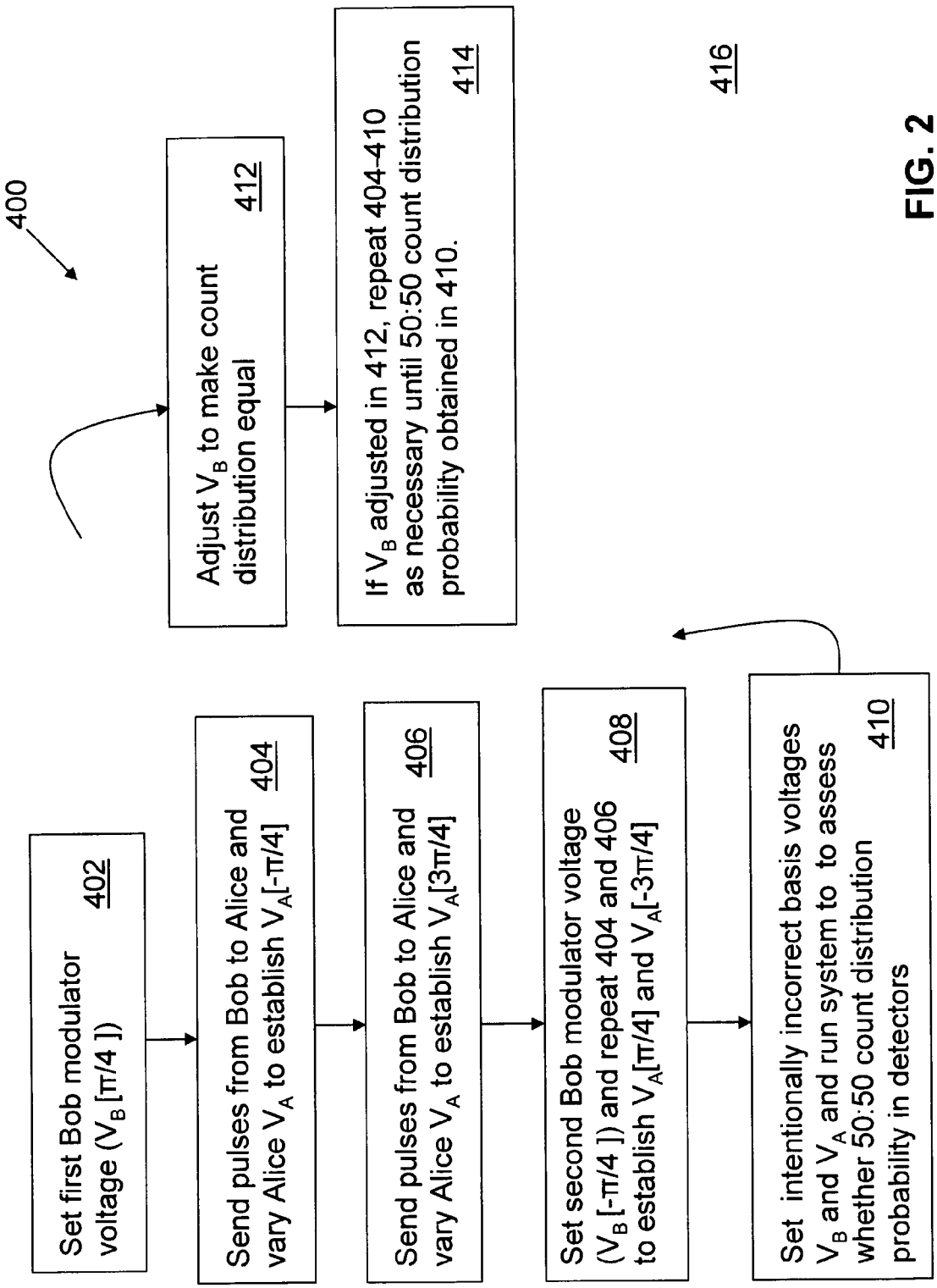
FIG. 2 is a flow diagram of an example embodiment of the method of performing modulator autocalibration as described in connection with the two-way QKD system of FIG. 1.

With continuing reference to FIG. 1 and also to flow diagram 400 of FIG. 2, in 402 controller 50 instructs voltage driver 44 to provide a first select basis voltage—say $V_B(1)=V_B[\pi/4]$—to phase modulator MB. This process is carried out (schematically) by sending a control signal SC1 from controller 50 to voltage driver 44. Control signal SC1 is timed to modulate pulse P1 when it returns from Alice. This voltage depends on the type of modulator, but may be, for example, 1 volt. Voltage $V_B(1)=V_B[\pi/4]$ sets modulator MB to a nominal phase setting of $\pi/4$.

In 404, Bob generates and sends pulses P1 and P2 through optical fiber link FL over to Alice. While pairs of pulses P1 and P2 are being sent back and forth between Bob and Alice, Alice activates her modulator with voltage signal $V_A$. This process is illustrated schematically by sending a control signal SC2 to voltage driver 14 from controller 20. The voltage signal $V_A$ is timed to modulate pulse P2. Thus, the calibration operation of QKD system 100 is similar to the normal key-exchange operation, except that the modulations are not randomly selected but are instead set directly by the respective controllers.

Alice's voltage $V_A$ is varied in the negative direction during the exchange of pulses. For each voltage value $V_A$, a number of pulse pairs P1 and P2 (e.g., $10^6$) are exchanged and the number of interfered signals detected in detectors 32a and 32b is recorded in controller 50.

Voltage $V_A$ is so varied until the total (relative) phase shift $\phi_T=\phi_A+\phi_B$ imparted to the pulses is 0 (constructive interference) is observed as a maximum photon count for the returned interfered pulses being detected in detector 32a, and a minimum photon count in detector 32b. This voltage is assigned a basis value, which in the present example is $V_A(1)=V_A[-\pi/4]$.

Figure 3:
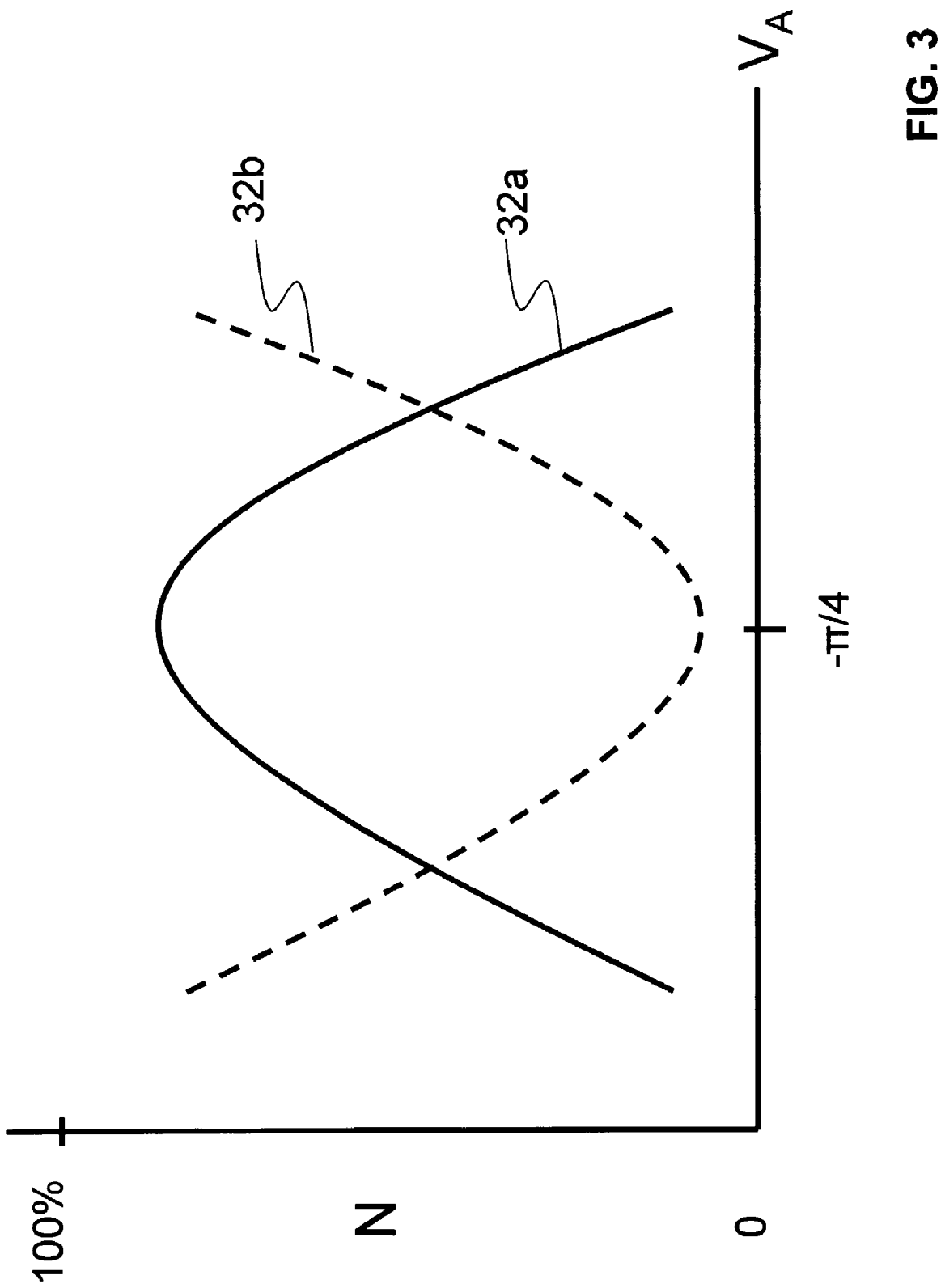
FIG. 3 is a graph that illustrates the variation in photon count in detectors 32a and 32b as a function of Alice's varying modulator voltage $V_A$ for the case where $V_A = -\pi/4$ corresponds to constructive interference in the detected interfered pulse as indicated by a maximum photon count in detector 32a and a minimum photon count in detector 32b.
Figure 4:
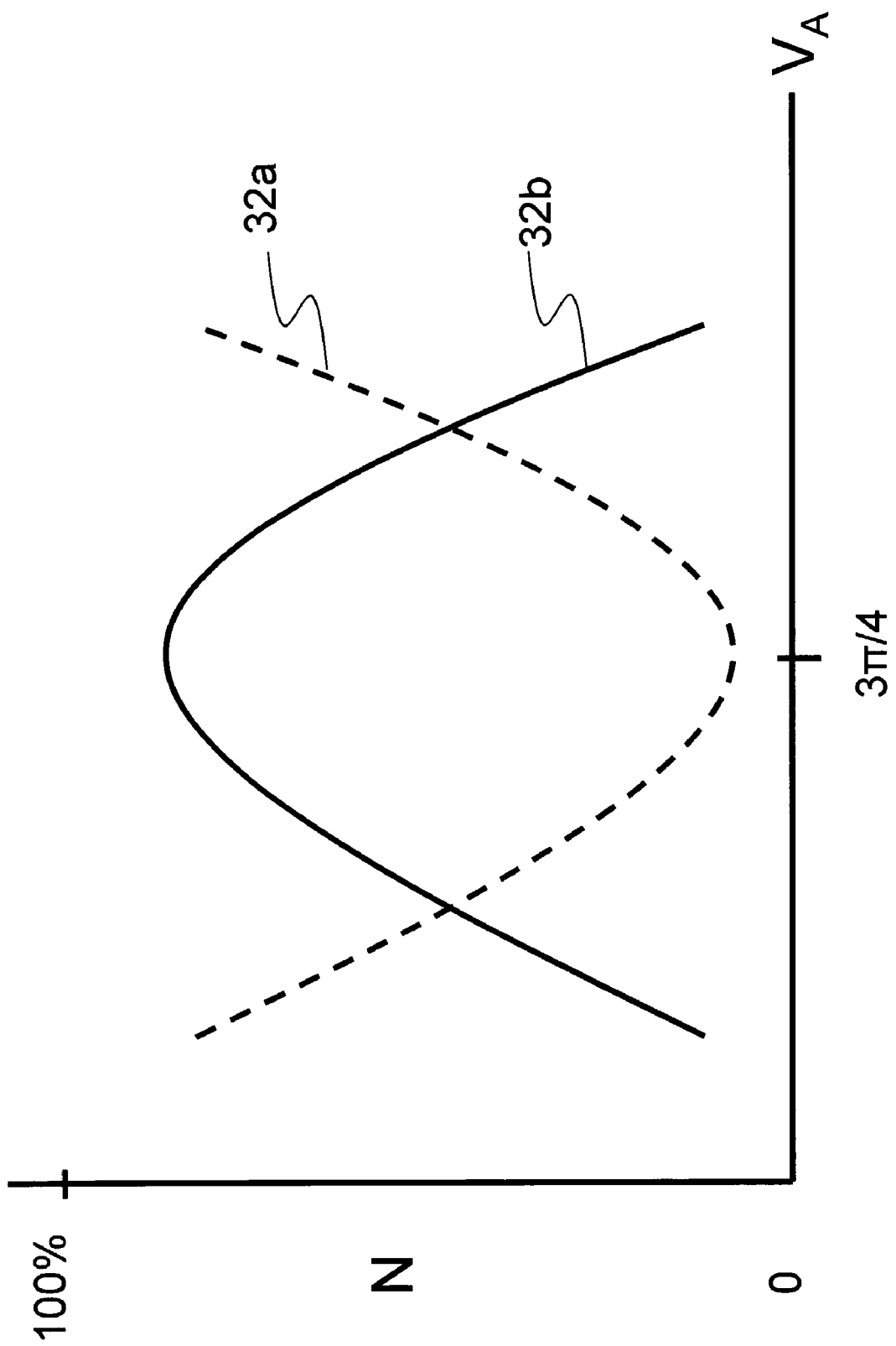
FIG. 4 is a graph that illustrates the variation in photon count in detectors 32a and 32b as a function of Alice's varying modulator voltage $V_A$ for the case where $V_A = 3\pi/4$ corresponds to destructive interference in the detected interfered pulse as indicated by a minimum photon count in detector 32a and a maximum photon count in detector 32b.

FIG. 3 is a graph that illustrates the variation in photon count N in detectors 32a and 32b as a function of voltage $V_A$. The lack of an absolute maximum and minimum in the photon count results from detector dark count. In practice, because of the detector dark count, it is easier to measure the minimum photon count in detector 32b rather than the maximum photon count in detector 32a to establish the basis voltage $V_A(1)=V_A(-\pi/4)$ This basis voltage is then set to be $V_A(1)=V_A[-\pi/4]$ in voltage driver 14, and this value is stored in the controller.

It is worth noting that in 404, the pulses P1 and P2 returning to Bob from Alice are preferably weak (quantum pulses). However, these pulses could be strong pulses if used in combination with photodiode detectors arranged at Bob suitable for detecting strong pulses. For the sake of simplicity, however, quantum pulses are preferred, since the detectors 32a and 32b are single-photon detectors.

In 406, the voltage $V_A$ provided to Alice's modulator MA is again varied as described above, but in the positive voltage range, until the total relative phase shift imparted to the pulses is $\pi$ (destructive interference) as indicated by a maximum photon count in detector 32b and a minimum photon count in detector 32a. Again, in practice it is easier to measure the minimum photon count in detector 32a to establish the corresponding basis voltage $V_A(2)=VA[3\pi/4]$. This voltage is then set to $V_A(2)=VA[3\pi/4]$ in voltage driver 14 and the result stored in controller 20 as described above.

At this point, Bob's voltage has been set initially at $V_B(1)=V_B[\pi/4]$ and Alice's corresponding basis voltages $V_B(1)=V_A[-\pi/4]$ and $V_A(2)=V_A[3\pi/4]$ have been established.

In 408, Bob's modulator voltage $V_B$ is changed via control signal SC1 to the remaining basis voltage, which in this example case is $V_B(2)=V_B[-\pi/4]$. Acts 404 and 406 are then repeated to establish $V_A(3)=V_A[\pi/4]$ by varying $V_A$ in the positive voltage range, and to establish $V_A(4)=V_A[-3\pi/4]$ by varying the voltage in the negative voltage range. Once this is accomplished, all of the (initial) basis voltages needed for modulating Bob's modulator MB and Alice's modulator MA are established, and the information stored in the respective controllers.

Once the basis voltages for the modulators are established per above, the orthogonality of the voltages needs to be checked. Thus, in 410, QKD system is operated with the modulators MA and MB intentionally set at fixed basis voltages that correspond to Bob making an "incorrect" basis measurement, i.e., the total phase $\phi_T$ imparted to the pulses is not a multiple of $\pi$. This is accomplished via respective control signals SC1 and SC2 sent from respective controllers 50 and 20 to respective voltage drivers 44 and 14. For example, Bob's basis voltage is set to $V_B[\pi/4]$ and Alice's basis voltage is set at $V_A[\pi/4]$, so that Bob's modulator MB is set to impart a phase $\phi_B=+\pi/4$ and Alice's modulator is set to impart a phase $\phi_A=\pi/4$. This set-up yields a total imparted (nominal) relative phase of $\phi_T=\pi/2$ between the pulses.

The distribution of counts in detectors 32a and 32b is then measured and assessed. Ideally, the count distribution should be equal since the probability of a count occurring in each detector should be 50:50 when Bob selects the "incorrect" phase basis. If in 410 the count probability is found to be equal (i.e., 50:50), then the basis voltages are orthogonal and represent calibrated basis voltages for modulators MB and MA.

On the other hand, the initially established basis voltages may be found not to be orthogonal. Thus, if in 410 the number of counts in detector 32a is greater than that recorded by detector 32b, then in 412 Bob's modulator voltage $V_B[\pi/4]$ is increased, and if it is less than that recorded by detector 32b, then in 412 Bob's modulator voltage $V_B[\pi/4]$ is decreased. In 414, acts 406 through 410 are repeated until the ideal 50:50 detector count probability distribution is achieved. This confirms orthogonality in the basis voltages.

Performing the above acts yields calibrated basis voltages $V_B(1)$ and $V_B(2)$ for Bob's modulator MB and calibrated voltages $V_A(1)$, $V_A(2)$, $V_A(3)$ and $V_A(4)$ for Alice's modulator MA. The calibrated basis voltage values are stored in their respective voltage drivers 44 and 14 (or in their respective controllers 50 and 20) so that control signals S3 and S2 sent from respective RNG units 46 and 16 to the voltage drivers (or alternatively, control signals sent from the controllers to the voltage drivers) trigger the proper basis voltage value and thus the proper phase modulation.

The QKD system is now ready for ideal operation. For security reasons, the above-described procedures are preferably performed when Alice and Bob and optical fiber link FL are all in a secure location so there is no eavesdropper to alter the calibration. However, for the sake of necessity, the above-described procedures may need to be performed in the field even though this presents a security risk.

On-Going Modulator Autocalibration

An example embodiment of the modulator autocalibration method of the present invention includes monitoring the counts in each detector that result from an incorrect basis measurement during the normal operation of the QKD system. As mentioned above, this count distribution should be 50:50 during system operation. After performing the QKD protocol, deviations from this count distribution can be used as a diagnostic tool. When other sources of error are eliminated, this parameter can be used as a trigger to initiate the above-described autocalibration process. This allows the modulators of the QKD system to be calibrated on an on-going basis or periodically as needed.

In an example embodiment, the modulator calibration methods are accomplished by including in controllers 20 and 50 software embodied in a tangible medium (e.g., a hard drive, not shown) that has instructions for carrying out the method discussed above.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of calibrating a quantum key distribution (QKD) system having a first QKD station (Bob) with a first modulator (MB) and a second QKD station (Alice) with a second modulator (MA), comprising:
   a) operating the QKD system with a first modulator basis voltage value $V_B(1)$ for the first modulator and varying a basis voltage $V_A$ for the second modulator to establish a first basis voltage value $V_A(1)$ for the second modulator that yields constructive interference of detected quantum pulses;
   b) operating the QKD system with the first modulator basis voltage value $V_B(1)$ for the first modulator while varying the basis voltage $V_A$ for the second modulator to establish a second basis voltage value $V_A(2)$ for the second modulator that yields destructive interference of detected quantum pulses;
   c) operating the QKD system with a second modulator basis voltage value $V_B(2)$ for the first modulator and varying the basis voltage $V_A$ for the second modulator to establish a third basis voltage value $V_A(3)$ for the second modulator that yields constructive interference of detected quantum pulses; and
   d) operating the QKD system with the second modulator basis voltage value $V_B(2)$ for the first modulator while varying the basis voltage $V_A$ for the second modulator to establish a fourth basis voltage value $V_A(4)$ for the second modulator that yields destructive interference of detected quantum pulses.

2. The method of claim 1, including:
   e) operating the QKD system with basis voltages for the first and second modulators that would be expected to yield a 50:50 photon count probability between each of two single-photon detectors;
   f) measuring the photon count probability using the single-photon detectors; and
   g) if the measured photon count probability in f) is not 50:50, varying at least one of the basis voltage values $V_B(1)$ and $V_B(2)$ for the first modulator and repeating acts a) through f) until the photon counts probability becomes 50:50.

3. A method according to claim 1, including:
   during operation of the QKD system, measuring photon counts in respective first and second single-photon detectors to establish the basis voltages $V_A(1)$, $V_A(2)$, $V_A(3)$ and $V_A(4)$ that yield a minimum photon count in either of the first and second detectors.

4. A method of calibrating a quantum key distribution (QKD) system having first and second operably coupled QKD stations Bob and Alice with respective first and second modulators MB and MA driven by respective basis voltages $V_B$ and $V_A$, comprising:
   a) exchanging photons between the QKD stations while fixing basis voltage $V_B$ to a first value $V_B(1)$ and varying basis voltage $V_A$ to determine basis voltage values $V_A(1)$ and $V_A(2)$ that correspond to either a minimum or maximum photon count; and
   b) exchanging photons between the QKD stations while fixing the basis voltage $V_B$ to a second value $V_B(2)$ and varying the basis voltage $V_A$ to determine basis voltage values $V_A(3)$ and $V_A(4)$ that correspond to either a minimum or maximum photon count.

5. The method of claim 4, including operating the QKD system with the basis voltage values $V_B(1)$, $V_B(2)$, $V_A(1)$, $V_A(2)$, $V_A(3)$ and $V_A(4)$.

6. The method of claim 4, including:

c) operating the QKD system with basis voltage values other than $V_B(1)$, $V_B(2)$, $V_A(1)$, $V_A(2)$, $V_A(3)$ and $V_A(4)$, and measuring a probability distribution of detecting constructive versus destructive interference between photons modulated by modulators MA and MB to assess orthogonality of the basis voltage values $V_B(1)$, $V_B(2)$, $V_A(1)$, $V_A(2)$, $V_A(3)$ and $V_A(4)$.

7. The method of claim 6, including repeating acts a) through c) with one or more different basis voltage values for voltage $V_B$ if the measured probability distribution is different than 50:50, so as to establish values for basis voltages $V_A$ and $V_B$ that yield the 50:50 probability distribution.

8. The method of claim 6, including programming a controller operably coupled to i) modulator drivers that are operably coupled to modulators MB and MA, respectively, and ii) to first and second single-photon detectors, to carry out acts a) through c).

9. A method of calibrating first and second modulators in a quantum key distribution (QKD) system, comprising:

a) operating the QKD system with a first fixed modulation voltage value $V_B(1)$ for the first modulator and varying a modulation voltage $V_A$ for the second modulator to establish first and second basis voltage values $V_A(1)$ and $V_A(2)$ for the second modulator by measuring photon counts; and b) operating the QKD system with a second fixed modulation voltage value $V_B(2)$ for the first modulator and varying the modulation voltage $V_A$ of the second modulator to establish third and fourth basis voltage values $V_A(3)$ and $V_A(4)$ for the second modulator based on measuring photon counts.

10. The method of claim 9, including:

measuring an orthogonality of basis voltage values $V_B(1)$, $V_B(2)$, $V_A(1)$, $V_A(2)$, $V_A(3)$ and $V_A(4)$.

11. The method of claim 10, including adjusting at least one of the basis voltages so that the basis voltage values are orthogonal if the measurement of claim 9 reveals that the basis voltage values are not orthogonal.

12. The method of claim 10, wherein measuring the orthogonality of the basis voltage values includes:

c) setting the basis voltages to values expected to yield a 50:50 photon count probability distribution between constructively and destructively interfered photons;

d) measuring the photon count probability distribution; and e) if the photon count probability distribution is other than 50:50, adjusting at least one of the basis voltages for the first modulator and repeating acts a) through d) to achieve a 50:50 photon count probability distribution.

13. The method of claim 9, including operating the QKD system with the basis voltage values $V_B(1)$, $V_B(2)$, $V_A(1)$, $V_A(2)$, $V_A(3)$ and $V_A(4)$ as calibrated basis voltages.

* * * * *